Nov. 4, 1969  T. E. HAYES  3,475,904
HEAT MOTOR UTILIZING EXPANSIBLE FLUID FOR DRIVING A PISTON
Filed June 26, 1967
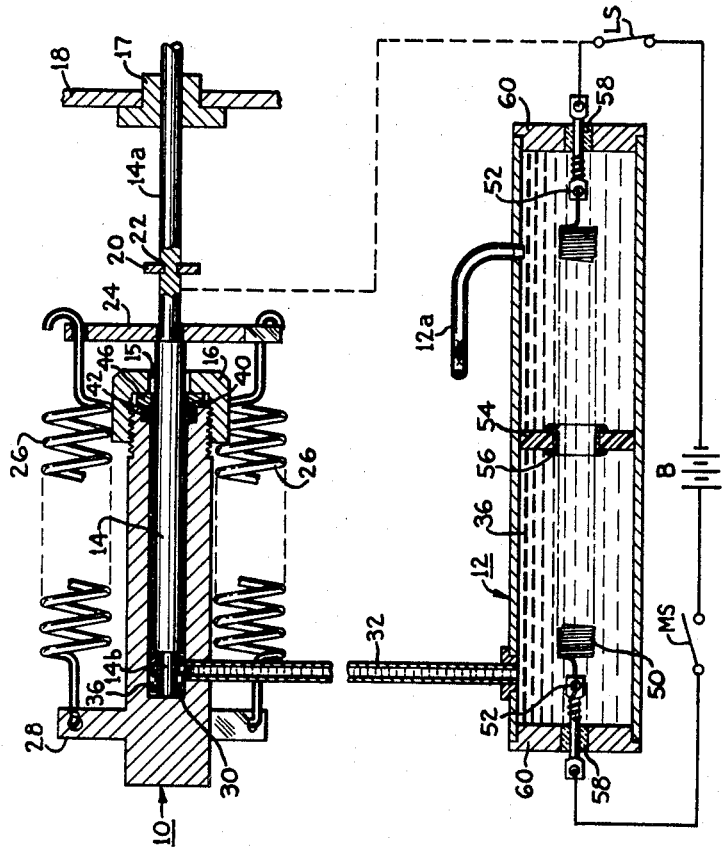
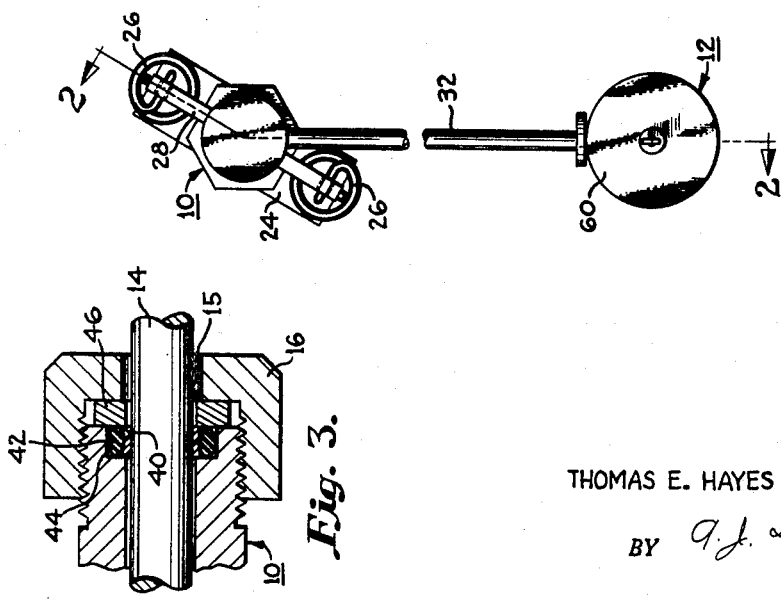
THOMAS E. HAYES  INVENTOR.
BY *A. J. De Azglio*
ATTORNEY.

United States Patent Office 3,475,904
Patented Nov. 4, 1969

3,475,904
HEAT MOTOR UTILIZING EXPANSIBLE FLUID FOR DRIVING A PISTON
Thomas E. Hayes, Goshen, Ind., assignor to Penn Controls, Inc., Wheaton, Ill., a corporation of Delaware
Filed June 26, 1967, Ser. No. 648,629
Int. Cl. F03g 7/06
U.S. Cl. 60—23                                9 Claims

ABSTRACT OF THE DISCLOSURE

A piston actuatable within a cylinder in response to expansion due to heating of a fluid contained therein has a portion extending through a seal in the end wall of the cylinder for driving external mechanism. An electric resistance heater is immersed in the fluid in a second cylinder which is interconnected through capillary tubing with the first cylinder. The construction of the two cylinders and the interconnecting tubing is such as to minimize conduction of heat from the resistance heater to the seal, enabling the seal to function at relatively high pressures of up to 3,000 pounds per square inch at the seal and temperatures up to 375° F. of the fluid in the vicinity of the resistance heater.

---

The invention relates to heat motors and especially to such motors utilizing fluid which is expansible in response to heating for driving a piston.

It is desirable to operate various mechanisms, such as dampers and water valves, by means of such heat motors. In modern day installations many such operated dampers and valves often remain immobile for prolonged periods, as for example in heating installations during the summer months. This sometimes causes these mechanisms to bind, requiring substantial forces for their actuation. Furthermore, the heat motors actuating such dampers and valves often must function under conditions of relatively high ambient temperatures. Such heat motors, thus, of necessity must operate under conditions of relatively high pressures and temperatures. Sealing means which will withstand such high temperatures and pressures must, therefore, be provided where the piston connecting rod extends through the wall of the operating cylinder for transmitting the piston moveemnt to an external damper or valve. Such sealing means must prevent leakage of the fluid contained within the cylinder and driving the piston, while permitting sliding movement of the piston connecting rod through the cylinder wall. Modern day sealing means have inherent limitations of maximum operating pressures and temperatures at which they will adequately perform a sealing function.

It is, therefore, desirable to provide a heat motor of the expansible fluid, piston driving type which is operative under conditions of substantial pressures at the seal and of substantial temperatures heating the fluid, while ambient temperatures are relatively ineffectual to its operation.

In carrying out the invention according to one arrangement thereof, a piston in the form of a cylindrical rod is positioned for sliding axial movement in a hollow cylinder which is closed at one end. The rod extends through a hole formed in a cap screwed onto the other end of the cylinder and actuates external mechanism. A "Teflon" ring backed by an O-ring encircles the rod where it passes through the cap to seal the expansible fluid in the cylinder, while permitting sliding movement of the rod. The expansible fluid fills a reservoir at the closed end of the cylinder and is connected through capillary tubing to a second cylinder also fluid filled and substantially larger than the first cylinder. Electrically energizable heating means are in heat transfer relationship with the expansible fluid in the second cylinder. The thermal separation between the two cylinders and the radiating surface and mass of the first cylinder are selected such that, while the heat applied to the fluid is effective to obtain full piston stroke, it is not transmitted sufficiently to the area of the seal to affect adversely its sealing function at relatively high operating pressures and ambient temperatures. To minimize the effects of ambient temperatures on the operation of the heat motor, the fluid fill of the cylinder is such that the piston does not begin to move until the fluid has been heated to approximately 200° F. above ambient.

Features and advantages of the invention will be seen from the above, and from the following description of the operation of the preferred embodiment when considered in conjunction with the drawing and from the appended claims.

In the drawing:

FIGURE 1 is a diagrammatic end view of a heat motor including an operating cylinder and a larger heating cylinder interconnected by capillary tubing and embodying the invention;

FIGURE 2 is a sectional view of the heat motor taken along the line 2—2 of FIGURE 1 and including a simplified schematic representation of an electrical energizing circuit for the electrical resistance heating means of the heat motor; and FIGURE 3 is a fragmentary sectional view, slightly enlarged, of the right end of the operating cylinder of FIGURE 2.

With reference to the drawing, the heat motor includes an operating chamber, generally designated 10, and a heating chamber, generally designated 12, both being of generally hollow cylindrical configuration. Operating cylinder 10 is formed closed at its left end (FIG. 2) and opened at the other end. A cylindrical rod 14 is positioned in operating chamber 10 for sliding movement therein along the longitudinal axis of the chamber to function as a piston. Rod 14 extends through a hole 15 formed in an end cap 16 threaded onto the open end of cylinder 10. The externally extending portion of rod 14 is provided with a necked-down portion 14a for attachment to driven mechanism, such as a damper (not shown). Necked-down portion 14a extends through a bushing 17 mounted in supporting framework 18. An annular washer 20 is mounted in a peripheral groove 22 formed on necked-down portion 14a in position to limit against bushing 17 to stop movement to the right of piston 14. A collar 24 is slid onto the necked-down portion 14a of rod 14 to serve as attachment means for two coil springs 26. Coil springs 26 are each attached at one end to collar 24 and at their other ends, under tension, to a flange 28 formed on and extending outwardly from the closed end of cylinder 10. Springs 26 bias rod 14 to the left to an initial unactuated position (FIG. 2).

The left hand end 14b of rod 14 is also necked-down to leave a reservoir 30 for expansible fluid when rod 14 is bottomed against the end wall of cylinder 10 by springs 26.

Capillary tubing 32 interconnects reservoir 30 with the interior of heating chamber 12. Heating chamber 12, capillary tubing 32 and reservoir 30 are filled through inlet 12a of cylinder 12 with an electrically non-conductive fluid 36 which expands when heated, such as silicon oil. Inlet 12a is then sealed in any convenient manner.

The capped end of operating cylinder 10 through which piston 14 extends is sealed to prevent escape of fluid 36, while permitting sliding movement of piston 14. Such sealing is effective by means of a ring 40 encircling rod 14, as is seen in FIG. 3. Ring 40 is of fluorocarbon plastic material, such as the Du Pont plastic trademarked "Teflon," and is "backed up" by a rubber O-ring 42. In assembly, Teflon ring 40 and O-ring 42 are placed into an annular groove 44 formed in the open end of cylinder 10 in position to encircle piston rod 14. A phosphor bronze washer 46 is placed encircling rod 14 and end cap 16 is screwed onto the threaded open end of cylinder 10. The low friction characteristic of the Teflon allows free sliding movement of rod 14, while the combination of Teflon ring 40 and the O-ring 42 effectively seals the hole through which rod 14 moves against leakage of fluid 36.

Suspended in heating chamber 12 is an electric resistance element 50 for transmitting heat to fluid 36. Resistor 50 is attached at each end to electrical terminals 52 and is supported at its midsection by a Teflon washer 54 encircling a brass eyelet 56, the washer 54 frictionally engaging the inside surface of cylinder 12. Terminals 52 are fused in glass bushings 58 mounted in end caps 60.

An electric circuit for selectively energizing resistor 50 is shown schematically as comprising a battery B, a manual switch MS and a piston actuated limit switch LS interconnected to terminals 52 and in series with resistor 50. Limit switch LS is actuated by movement of piston 14 and is shown normally closed for the unactuated condition of the piston. Switch LS is actuated to open condition upon piston 14 moving to the right to its maximum operated position where collar 20 limits against bushing 17 and is reactuated closed, as collar 20 moves away from bushing 17.

In operation, assume that switch MS is closed, applying current from battery B through limit switch LS (presently closed) to resistor 50. The heat generated by resistor 50 is transferred to fluid 36 with which it is in intimate contact. When fluid 36 is heated sufficiently, it expands through capillary tubing 32 and reservoir 30, actuating piston 14 to the right (FIG. 2). Continued heating of fluid 36 causes sufficient expansion of the fluid to actuate piston 14 its full stroke until collar 20 limits against bushing 17. As piston 14 arrives at its final limit position, it actuates limit switch LS to open position, de-energizing resistor 50. As fluid 36 cools, piston 14 is forced to the left by its biasing springs 26, causing limit switch LS again to close. This allows resistor 50 to be re-energized through manual switch MS, should it be desired.

It is to be understood that switch MS, though shown as manually operated, may be an automatic control, such as a thermostatic switch.

Upon opening of switch MS and subsequent cooling of fluid 36, springs 26 effect return of piston 14 toward its initial unactuated condition. Thus, piston 14 is moved to a given position in its cylinder 10 depending upon the temperature applied to fluid 36 by heating means 50 to function as a heat motor for actuating external mechanism (not shown).

In one tested embodiment of the subject invention cylinder 10 and end cap 16 were composed of brass and piston rod 14 of high carbon steel. End cap 60 of heating cylinder 12 was made of cold rolled steel and was silver brazed to the cylinder walls which were made of beryllium. Capillary tubing 32 was formed of copper. It should be understood that other materials such as stainless steel, may be utilized for cylinders 10, 12 and for tubing 32 if desired.

The length of capillary tubing 32 in the tested embodiment approximated 3 inches. Heating cylinder 12 had internal dimensions of 4 inches longitudinally with a ¾ inch inside diameter, while operating cylinder 10 had approximately 1 inch longitudinal inside dimension and a ¼ inch inside diameter and a .625 inch outside diameter.

Resistor 50 was selected of Nichrome wire of approximately .022 inch diameter having an ohmic value of 1.28 ohms per foot, the resistor approximating 9.6 ohms and 116 turns.

The piston stroke was initiated when fluid 36 in operating cylinder 12 was heated to 200° F. Continued heating to 285° F. effected the full stroke movement of 1 inch with a 75° F. ambient temperature. At these operating temperatures in fluid heating chamber 12, the temperatures at the piston seal in cylinder 10 attained a maximum of 145° F. and 147° F. in two tested embodiments, respectively. The change in temperature above ambient at the seal was, therefore, 67° F. and 69° F., respectively. At the same time, the pressures developed at the seal (40, 42), under such conditions, were 750 pounds per square inch to 3,000 pounds per square inch.

It should also be noted that, since the piston movement is not initiated until the temperature of 200° F. is attained by fluid 36 in cylinder 12, the effects of variations in ambient temperature upon piston movement are minimized.

It is seen that in the tested embodiment described, sufficient thermal isolation is attained between the heating means (resistor 50), and the sealing means (O-ring 42 and Teflon ring 40) to enable operation of the piston at substantial pressures at such seal with relatively high ambient temperatures and with substantial heating of the fluid 36. The necessary thermal isolation and heat dissipation was accomplished by providing two separate cylinders interconnected by capillary tubing and by providing sufficient mass for operating cylinder 10 to allow rapid dissipation of heat at the sealing means area. This arrangement, thus, provides the substantial forces required for operation of mechanisms such as dampers and water valves in modern day installations.

It should be understood that similar results may be attained by providing one long cylinder with the heating means at one end and the piston and sealing means at the other end.

As changes can be made in the above described construction in many apparently different embodiments of this invention without departing from the scope thereof, it is intended that all matter contained in the above description or shown on the accompanying drawing be interpreted as illustrative only and not in a limiting sense.

What is claimed is:

1. A heat motor including:
   a chamber,
   a piston slidable in said chamber,
   a drive rod connected to said piston and slidably extending out of said chamber for imparting the movement of said piston in said chamber to mechanism external thereto,
   a fluid in said chamber and having the characteristic to expand in volume in response to an increase in temperature thereof, said fluid being positioned on one side of said piston for driving the piston in said chamber,
   sealing means for sealing said chamber against leakage of said fluid past said drive rod,
   a means for supplying heat selectively to said fluid, characterized in that,
   said heat supplying means are in heat transmitting contact with said fluid but thermally isolated sufficiently from said sealing means as to maintain the temperature at said sealing means substantially near ambient temperature throughout the range of response of said piston to said fluid heating.

2. A heat motor as set forth in claim 1 wherein said drive rod is formed integral with said piston.

3. A heat motor as set forth in claim 1 wherein there is provided a second chamber separate from that containing said piston,
   said second chamber also being filled with said heat responsive expanding fluid, and
   wherein said chambers are interconnected by tubing permitting flow of said fluid between chambers, and
   wherein said heat supplying means are in heat transfer relationship with said fluid in said second chamber, 4. A heat motor as set forth in claim 3 characterized in that said heating means comprises an electrical resistor suspended in said fluid in said second chamber, said fluid being electrically non-conductive and in heating relationship with said electrical resistor.

5. A heat motor as set forth in claim 1 wherein there is provided energy storage means biasing said piston towards a first inoperative position against movement by said fluid expansion.

6. A heat motor as set forth in claim 1 wherein said heat motor chamber comprises two interconnected chambers, a first one of said chambers being an operating chamber containing said piston, and a second one of said chambers being a heating chamber serving as a reservoir in which said fluid is heated, and capillary means interconnect said chambers permitting fluid to flow therebetween in response to heating and cooling of the fluid in said chambers while substantially preventing thermal input to said fluid in said second chamber from affecting the temperature at said sealing means.

7. A heat motor set forth in claim 6 wherein said interconnecting capillary means is tubing of a predetermined small bore and sufficient length to prevent thermal conduction from adversely affecting the function of said sealing means.

8. A heat motor set forth in claim 7 wherein said heating chamber is substantially 36 times larger than said first chamber, and wherein said capillary tubing is in length, substantially three times the length of the stroke of said piston and of an internal bore approximating $\frac{1}{10}$ the piston diameter.

9. A heat motor as set forth in claim 7 wherein said operating chamber is provided with heat sink means sufficient to dissipate at least 50% of the heat generated by said heating means.

References Cited

UNITED STATES PATENTS

| | | | |
|---|---|---|---|
| 1,400,422 | 12/1921 | Curtis | 92—170 X |
| 2,050,481 | 8/1936 | Blazek et al. | 92—132 X |
| 2,237,248 | 4/1941 | Denison | 60—23 X |
| 3,166,892 | 1/1965 | Sherwood | 60—23 |
| 3,173,244 | 3/1965 | Schutmaat | 60—23 |
| 3,213,606 | 10/1965 | Martin et al. | 60—23 |
| 3,347,043 | 10/1967 | Freese | 92—61 X |

CARROLL B. DORITY, JR., Primary Examiner